United States Patent [19]

D'Annunzio et al.

[11] Patent Number: 4,834,924
[45] Date of Patent: May 30, 1989

[54] EXTRUSION APPARATUS FOR TUBULAR THERMOPLASTIC FILMS INCLUDING TWO (TANDEM) SPACED AIR RINGS FOR CONTROLLING COOLING RATE AND PRODUCTION SPEEDS

[75] Inventors: Lynne M. D'Annunzio; Eric A. St. Phillips; Gordon V. Sharps, Jr., all of Fairport, N.Y.

[73] Assignee: Mobil Oil Corporation, New York, N.Y.

[21] Appl. No.: 148,306

[22] Filed: Jan. 25, 1988

[51] Int. Cl.$^4$ .............................................. B29C 17/92
[52] U.S. Cl. ................................. 264/40.3; 264/40.6; 264/566; 264/568; 264/569; 425/72.1; 425/326.1; 425/379.1
[58] Field of Search .............. 264/40.3, 40.6, 564–569, 264/40.6; 425/326.1, 72.1, 379.1

[56] References Cited

U.S. PATENT DOCUMENTS

| | | | |
|---|---|---|---|
| 3,568,252 | 3/1971 | Masuda et al. | 425/72.1 |
| 4,069,292 | 1/1978 | Herrington | 264/40.3 |
| 4,259,047 | 3/1981 | Cole | 425/326.1 |
| 4,415,711 | 11/1983 | Jones | 425/326.1 |
| 4,473,527 | 9/1984 | Fujisaki et al. | 264/569 |
| 4,624,823 | 11/1986 | Audureau et al. | 264/569 |
| 4,632,801 | 12/1986 | Dowd | 264/569 |
| 4,749,346 | 6/1988 | Planeta | 425/326.1 |

FOREIGN PATENT DOCUMENTS

| | | | |
|---|---|---|---|
| 61-94740 | 5/1986 | Japan | 425/72.1 |
| 61-235128 | 10/1986 | Japan | 425/72.1 |

Primary Examiner—Jeffery Thurlow
Attorney, Agent, or Firm—Alexander J. McKillop; Charles J. Speciale

[57] ABSTRACT

An apparatus for cooling a tubular polymer film material which is being extruded, and more particularly, an apparatus for extruding tubular thermoplastic films including two tandem spaced air rings for controlling the cooling rate and production speeds of the thermoplastic films during extrusion thereof. Moreover, there is also disclosed a method for the cooling of an extruded tubular thermoplastic film material through the utilization of a tandem air ring cooling structure. An adjustable annular shroud is positioned intermediate the first and second air rings so as to allow for the inducement of external air immediately upstream of the first air ring, and which will permit the induced air and air from the first air ring to substantially egress through an annular gap provided between the shroud and the second or tandem air ring, thereby creating a vacuum which will draw the tubular film material into contact with the surface of the second or tandem air ring, and allow for an improved cooling due to the air added by the second air ring.

10 Claims, 1 Drawing Sheet

U.S. Patent    May 30, 1989    4,834,924

EXTRUSION APPARATUS FOR TUBULAR THERMOPLASTIC FILMS INCLUDING TWO (TANDEM) SPACED AIR RINGS FOR CONTROLLING COOLING RATE AND PRODUCTION SPEEDS

BACKGROUND OF THE INVENTION

1. Field of the Invention

The present invention relates to an apparatus for cooling a tubular polymer film material which is being extruded, and more particularly, pertains to an apparatus for extruding tubular thermoplastic films including two, or tandem spaced air rings for controlling the cooling rate and production speeds of the thermoplastic films during extrusion thereof. Moreover, the invention also relates to a method for the cooling of an extruded tubular thermoplastic film material through the utilization of a tandem air ring cooling structure.

In order to produce a continuous tubular film web from a molten polymer material upon extrusion of the material through the orifice of an annular extrusion die, the formed tubular film or bubble is cooled in order to solidify or essentially crystallize the molten polymer material and, depending upon the process, the material is cooled by external and/or internal cooling of the formed tubular film bubble.

Among various types of extrusion apparatus and processes currently employed in the technology, cooling of the extruded tubular polymer is effectuated by contacting the external surface of the formed tubular film; for example, which may be constituted of a linear or high-density ethylene polymer, with a cooling air flow being directed about the external peripheral surface and in the feed or machine direction of the advancing bubble or tubular film. This is implemented by positioning an annular air ring directly downstream of the discharge or orifice of the extrusion die, preferably by positioning the air ring on the extrusion die, so as to immediately cool the extruded molten polymer upon exiting from the extrusion die.

In order to enhance upon the rate and quality of the cooling of the extruded thermoplastic tubular film web, at least two or more air rings have been positioned in a spaced relationship to each other in the longitudinal direction of travel of the tubular film such that the flow of cooling air from the first air ring which is proximate the orifice of the extrusion die, is supplemented by a flow of cooling air from a second or tandem air ring positioned to extend about the tubular film web downstream of the first air ring.

Although the foregoing employment of tandem air rings has proven itself to be advantageous in comparison with the use of only a single cooling air ring, apparatus and methods for cooling the bubble or tubular film web through the intermediary of a plurality of spaced or tandem air rings have, in many instances, been somewhat inadequate in imparting a uniformity to the gauge of the plastic film tube or web, nor permitted for the implementation of sufficiently high production speeds, particularly for linear low-density polyethylene resins possessing low melt tension, so as to produce tubular film products embued with an accurate degree of gauge thickness and uniform quality.

The present invention is intended to improve upon prior art apparatus and methods for the cooling of extruded tubular thermoplastic film web materials currently utilized in the technology through the utilization of tandem air rings, by providing an enhanced control over the cooling air flow imparted to the external peripheral surface of the extruded tubular film material or bubble through the intermediary of an annular shroud member which is interposed between the two tandem air rings so as to enable a controllable air flow to be induced downstream of the first air ring and diverted prior to reaching the tandem or second air ring; while in addition thereto, the spacing or distance between the air rings may be varied so as to additionally enhance the degree or rate of cooling of the airflows impinging against the film web.

Various publications directed to methods and apparatus for the utilization of multiple or tandem air rings for cooling extruded tubular thermoplastic film materials are currently known in the technology.

Jones, et al. U.S. Pat. No. 4,330,501 discloses a method and apparatus for cooling a film bubble which is constituted of a thermal plastic polymer, wherein a first air ring positioned immediately downstream of and extends about the orifice of a tubular extrusion die causes an air flow to pass along the outer peripheral surface of the extruded air bubble, and with the air flow from the first air ring being supplemented by an additional cooling air flow from a second or tandem air ring positioned to extend about the film bubble at the location downstream of the first air ring. The air flow from the first air ring is passed along the surface and admixed with the air flow from the tandem air ring in view of an encompassing barrier or shroud extending between the air rings which forces the entire air flow from the first air ring to be passed along the surface of the extruded plastic tube or bubble past the tandem air ring.

Blakeslee, III et al. discloses a tandem air ring structure for cooling an extruded thermoplastic tubular film material, in which the presence of an annular barrier extending between the first and second air rings forces the flow of cooling air from the first air ring to be passed along the surface of the extruded tubular film and admixed with the airflow from the tandem or second air ring.

Herrington U.S. Pat. No. 3,959,425 discloses a method for extruding and cooling tubular thermoplastic film, in which the tubular film is cooled subsequent to exiting from an extrusion die through the utilization of a plurality of superimposed air rings, in which the air flow from the collective air rings is combined into a single flow longitudinally extending along the external peripheral surface of the extruded tubular film material.

Although all of the foregoing multiple air ring structures for cooling the external surface of a tubular thermoplastic film material, among others employed in the technology, are generally satisfactory in operation, an inadequacy is encountered in controlling the expansion and quality of the extruded film material, inasmuch as the quantity of the cooling air flowing between the first and second air rings cannot be controlled in a precise manner.

SUMMARY OF THE INVENTION

In order to improve upon the operation of tandem or multiple air ring structures as presently employed in the prior art, the present invention contemplates the provision of an extrusion apparatus possessing at least two or tandem air rings which are axially spaced from each other, and wherein an adjustable annular shroud is positioned intermediate the first and second air rings so as to allow for the inducement of external air immediately upstream of the first air ring, and which will permit the induced air and air from the first air ring to substantially egress through an annular gap provided between the shroud and the second or tandem air ring, thereby creating a vacuum which will draw the tubular film material into contact with the surface of the second or tandem air ring, and allow for an improved cooling due to the air added by the second air ring.

The shroud may be mounted so as to be axially adjustable in its position intermediate the first and second or tandem air rings so as to be able to regulate the amount and/or flow of induced air between the air rings, or may even be seated on the first air ring, whereby either a portion or substantially all of the cooling air dispensed through the first air ring will exit prior to the dispensing of cooling air from the second or tandem air ring.

In contrast with constructions prevalent in the prior art, the presence of the adjustable shroud intermediate the air rings will, to an appreciable extent, provide for a more highly efficient cooling technique for the extruded tubular film web or bubble through the intermediary of a relatively simple apparatus. Furthermore, pursuant to another aspect of the invention, by structure allowing vertical adjustment between the spacings of the air rings, and in conjunction with the shroud, there is obtained a controlled induced flow of air intermediate the air rings, thereby improving upon the gauge uniformity of the thermoplastic film bubble, and allowing for high production speeds of, in particular, linear low-density polyethylene resins possessing low melt tension at an enhanced film cooling rate.

Accordingly, it is an object of the present invention to provide an improved novel extrusion apparatus for tubular thermoplastic films, which incorporates at least two tandem air rings at predetermined mutual spacing for controlling the cooling rate and production speeds of the films.

A more specific object of the present invention resides in the provision of a dual or tandem air ring structure for the external cooling of extruded tubular thermoplastic film webs or bubbles in which the spacing between the first air ring and the second or tandem air ring may be adjusted in conformance with production requirements; and in which an adjustably positionable shroud is arranged intermediate the air rings to provide for an induced air flow between the air rings which is discharged or reduced prior to reaching the second air ring.

Yet another object of the present invention is to provide for a method of extruding and cooling a tubular thermoplastic film material utilizing the inventive apparatus as described hereinabove.

BRIEF DESCRIPTION OF THE DRAWINGS

Reference may now be had to the following detailed description of a preferred embodiment of the invention, taken in conjunction with the accompanying drawings; in which.

DETAILED DESCRIPTION

Figure 1:
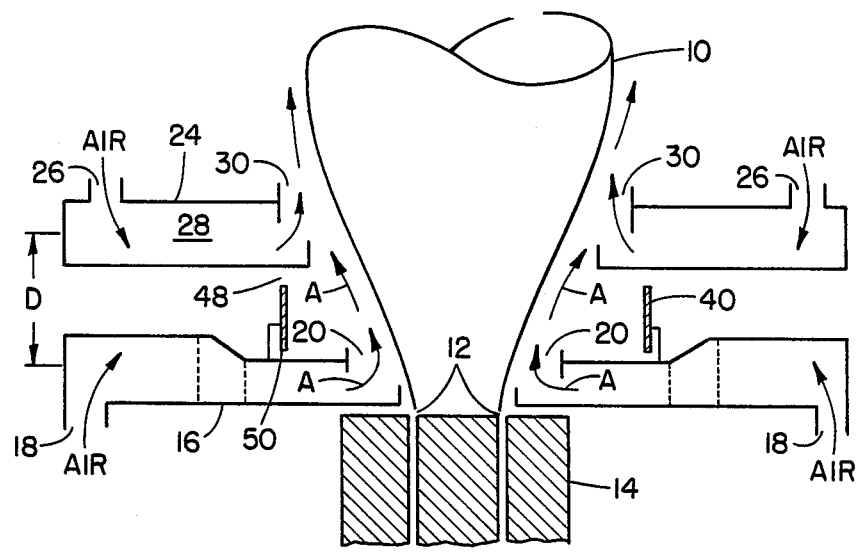
FIG. 1 illustrates a generally diagrammatic longitudinal sectional view through an extrusion apparatus incorporating a pair of adjustably spaced or tandem air rings, with an adjustably positionable shroud being interposed between the first and second air rings.

Referring specifically to the drawings, and particularly FIG. 1, there is schematically illustrated the discharge or extruding end portion of a tubular thermoplastic film extrusion apparatus, as well known in the art, in which a molten tubular film web or bubble 10 constituted of a polymeric melt is shown in the process of being extruded in a generally vertically upward direction through the annular extrusion orifice 12 of an extrusion die. Although illustrated as being extruded upwardly, it is of course readily apparent that the tubular film web may also be extruded downwardly or at any other suitable orientation relative to the vertical. The extruding apparatus communicating with the orifice of the tubular extrusion die 14 is not shown in detail and may be of any conventional construction, as is well known in the thermoplastic film extrusion technology.

Seated on the extrusion die 14, or in proximity thereto, is a first air ring 16 surrounding the film web 1 possessing an inlet 18 for receiving a supply of cooling air, and an annular outlet passageway or annularly spaced discharge orifices 20 communicating with a plenum in the air ring for dispensing a flow of cooling air which is directed towards the external peripheral surface of the tubular film web 10, and in which the air flow proceeds along the surface of the film web in the direction of advance thereof, as shown by arrows A in FIG. 1.

Arranged at an axial spacing or distance D from the first air ring 16 in the direction of advance of the film web 10, is a second air ring 24, referred to as a tandem air ring which, similar to air ring 16, possesses an air inlet 26 for the infeed of a flow of cooling air into a plenum 28 and then discharging the air from the latter through an annular air discharge passageway or series of annularly spaced orifices 30 so as to produce a flow of cooling air in a direction towards the external peripheral surface of the tubular film web 10 and along the direction of movement thereof.

Extending between the first and second air rings 16, 24 is a generally cylindrical shroud 40; for example, formed of sheet metal, which is fastened to the first air ring 16 through the intermediary of circumferentially spaced upstanding threaded rod members 42 extending through apertured lugs 44 o the shroud, and cooperating with threaded nuts 46 so as to be able to adjust the vertical positioning and spacing thereof relative to the air rings 16, 24. The height H of the cylindrical shroud 40 is dimensioned such as to allow for circumferential gap 48 to be present between the upper end of the shroud 40 and the bottom of the tandem or second air ring 24, and when desired, a circumferential gap 50 between the bottom of the shroud and the top of the first air ring 16, although the shroud may be seated on the first air ring 16.

The positioning of the shroud 40 between the air rings 16, 24 is such as to cause an aspirating air flow to be induced through the lower gap 50 between the shroud and the top of the first air ring 16 caused by the flow of air from the first air ring, and with the upper gap 48 providing for the withdrawal of the somewhat heated air through the upper gap 48 away from the surface of the film web prior to reaching the second air ring 24. This, in effect, will create a vacuum drawing the outer surface of the film web into closer contact with the inner diameter of the tandem or second air ring 24 in a controlled manner depending upon the air flow. The cooler air from the second air ring 24 will then flow in an axial direction along the outer peripheral surface of the tubular film web 10 so as to continue the enhanced cooling of the web.

Figure 2:
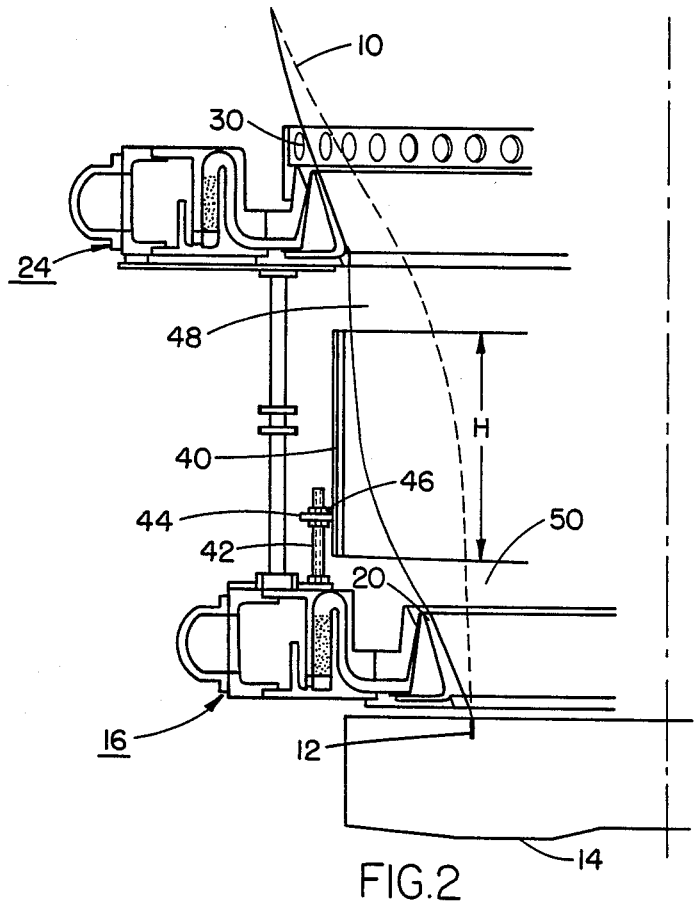
FIG. 2 illustrates, on an enlarged scale, a partial longitudinal sectional view similar to FIG. 1, showing the details of the inventive air ring arrangement for cooling the extruded tubular thermoplastic film material.

Pursuant to a further aspect of the invention, referring in particular to FIG. 2 of the drawings, the axial distance D between the tandem or first and second air rings 16, 24 may be readily varied by mounting the second air ring 24 on the first air ring 16 through the intermediary of a plurality of adjustable, annularly spaced supports 52 extending between the air rings 16, 24. The adjustable supports 52 may be constituted of telescopable rod members which may be clampingly engaged at different extended lengths thereof.

From the foregoing tandem air ring arrangement, which is of an extremely simple construction, and which permits for the ready accessibility an air flow and adjustment of the spacing between the air rings 16, 24 and the adjustability of the gaps at the bottom and/or upper end of the shroud 40 relative to, respectively, the first and second air rings, there is provided a controlled induced flow of air along the film web surface within the confines of the shroud, and a controlled discharge of the air induced through gap 50 and the air flow from the first air ring through the gap 50 downstream of the second air ring 24. This, in effect, facilitates an improved control over the uniformity in the gauge of the formed film web or bubble of the extruded polymeric material when, in contrast with the mere provision of an open spacing between the air rings or the provision of a barrier forming a closed passageway between tandem air rings, this arrangement will allow for higher production speeds in the formation of the tubular film web, particularly for linear low-density polyethylene resins possessing a low melt tension, while providing for an enhanced cooling rate of the material inasmuch as the heated air from the first air ring 16, and the additionally induced air flow from gap 50, is substantially discharged through gap 48 prior to reaching the tandem or second air ring 24.

From the foregoing, it becomes readily apparent that the axial adjustability between the two air rings 16, 24 and the positioning of a shroud 40 in a manner analogous to that pursuant to the invention for effectuating an induced air flow, will allow for an improved stability in the production of thermoplastic film webs, and particularly low melt tension tubular extrudates.

While there has been shown and described what is considered to be a preferred embodiment of the invention, it will, of course, be understood that various modifications and changes in form or detail could readily be made without departing from the spirit of the invention. It is therefore intended that the invention be not limited to the exact form and detail herein shown and described, nor to anything less than the whole of the invention herein disclosed and as hereinafter claimed.

What is claimed is:

1. An apparatus for cooling a tubular thermoplastic web film formed from a molten polymer material being extruded through the orifice of an annular extrusion die; said apparatus comprising: a plurality of cooling air rings extending in axially spaced relationship about said tubular film web in the direction of advance of said film web; each of said cooling air rings including means for directing an annular flow of a cooling medium towards the outer peripheral surface of said film web, said cooling air rings including a first air ring disposed in close proximity to the orifice of said annular extrusion die and at least one second air ring at a predetermined adjustable axial distance from said first air ring along the direction of advance of said tubular film web; and an annular shroud member extending between said first and second air rings, said shroud member terminating upstream of said second air ring so as to form an annular gap therebetween whereby flow of cooling medium from said first air ring is guided by said shroud member along the surface of said film web and substantially discharged through said gap prior to reaching said second air ring, said shroud member including means for adjusting the axial position of said shroud member relative to said first and second air rings so as to vary the size of said annular gap.

2. An apparatus as claimed in claim 1, wherein said shroud member is axially adjustably intermediate said first and second air rings to selectively form a second annular gap between said shroud member and said first air ring to thereby induce an inflow of air through said selective second gap for controlling the shape and rate of cooling of the tubular film web within the region of said shroud member.

3. An apparatus as claimed in claim 1, wherein said shroud member comprises a cylindrical sheet metal baffle plate, and said adjusting means comprises a plurality of peripherally-spaced threaded rod members axially projecting from said first air ring and means on said baffle plate threadingly engaging said threaded rod members for adjusting the axial position of said baffle plate relative to said air rings.

4. An apparatus as claimed in claim 1, comprising means for supporting said second air ring on said first air ring at predetermined axial spacings from said first air ring.

5. An apparatus as claimed in claim 4, wherein said means for supporting said second air ring comprises telescopingly adjustable rod members for controllably regulating the axial spacing between said first and second air rings.

6. An apparatus as claimed in claim 1, wherein said cooling medium comprises air.

7. A method of cooling a tubular thermoplastic film web formed from a molten polymer material which is extruded through the orifice of an annular die; comprising directing flows of a cooling medium towards the outer peripheral surface of said film web from a plurality of cooling air rings disposed in axially adjustably spaced relationship about said tubular film web in the direction of advance of said film web; one of said flows of cooling medium being from a first air ring disposed in close proximity to the orifice of said annular extrusion die and a second flow of cooling medium being from at least one second air ring at a predetermined adjusted axial distance from said first air ring along the direction of advance of said tubular film web; said flow of cooling medium from said first air ring being conducted within annular shroud member extending between said first and second air rings and terminating upstream of said second air ring so as to form an annular gap therebetween, the flow of cooling medium from said first air ring being guided by said shroud member along the surface of said film web and substantially discharged through said gap prior to reaching said second air ring; and adjusting the axial position of said shroud member relative to said first and second air rings for regulating the flow of cooling medium through said gap.

8. A method as claimed in claim 7, comprising axially adjusting the position of said shroud member to selectively form a second annular gap between said shroud member said first air ring so as to induce an inflow of air through said second gap for controlling the shape and rate of cooling of the tubular film web within the region of said shroud member.

9. A method as claimed in claim 7, comprising controllably adjusting the axial spacing between said first and second air rings and said shroud member.

10. A method as claimed in claim 7, wherein said cooling medium comprises air.

* * * * *